(12) United States Patent
Chen

(10) Patent No.: US 7,825,899 B2
(45) Date of Patent: Nov. 2, 2010

(54) PIANO-STYLE KEYPAD EMPLOYING A LIGHT GUIDE

(75) Inventor: Chao Chen, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 1035 days.

(21) Appl. No.: 11/458,145

(22) Filed: Jul. 18, 2006

(65) Prior Publication Data

US 2008/0018606 A1 Jan. 24, 2008

(51) Int. Cl.
*G06F 3/02* (2006.01)
(52) U.S. Cl. ..................... 345/168; 340/407.2
(58) Field of Classification Search ........................ None
See application file for complete search history.

(56) References Cited

U.S. PATENT DOCUMENTS

| | | | |
|---|---|---|---|
| 4,163,138 A | 7/1979 | Harden | |
| 4,349,705 A * | 9/1982 | Kuhfus | 379/361 |
| 4,421,966 A | 12/1983 | Pounds | |
| 4,490,587 A | 12/1984 | Miller et al. | |
| 4,540,865 A | 9/1985 | Calder | |
| 4,636,593 A * | 1/1987 | Novak et al. | 200/5 A |
| 4,937,408 A | 6/1990 | Hattori et al. | |
| 5,083,240 A | 1/1992 | Pasco | |
| 5,172,114 A | 12/1992 | Bedoya et al. | |
| 5,334,976 A * | 8/1994 | Wang | 341/22 |
| 5,500,497 A | 3/1996 | Merriman | |
| 5,655,826 A | 8/1997 | Kouno et al. | |
| 5,664,667 A * | 9/1997 | Kenmochi | 200/314 |
| 5,681,122 A | 10/1997 | Burke | |
| 5,746,493 A | 5/1998 | Jönsson et al. | |
| 5,804,780 A * | 9/1998 | Bartha | 200/5 A |
| 6,217,183 B1 * | 4/2001 | Shipman | 362/30 |
| 6,413,598 B1 | 7/2002 | Motoki et al. | |
| 6,423,171 B1 | 7/2002 | Yang | |
| 6,451,143 B2 | 9/2002 | Nishi | |
| 6,626,551 B2 | 9/2003 | Funamoto et al. | |
| 6,660,200 B2 * | 12/2003 | Nakajo | 264/154 |

(Continued)

FOREIGN PATENT DOCUMENTS

EP 0554084 A2 8/1993

(Continued)

OTHER PUBLICATIONS

Webster's dictionary definition of adjacent: http://www.merriam-webster.com/dictionary/adjacent; May 7, 2010.*

(Continued)

*Primary Examiner*—Alexander Eisen
*Assistant Examiner*—Matthew Yeung
(74) *Attorney, Agent, or Firm*—Curtis B. Behmann; Borden Ladner Gervais LLP

(57) ABSTRACT

An improved piano-style keypad comprises a light guide and a key sheet, with the light guide retaining the key sheet on a substrate, such as a printed circuit board of a handheld electronic device. The keypad is advantageously configured to enable key caps of the keypad to be adhered to key bodies of the keypad in a fashion that provides long-term reliability while still providing keys that can readily actuated and that provide tactile feedback that is desirable to the user.

21 Claims, 8 Drawing Sheets

U.S. PATENT DOCUMENTS

| | | |
|---|---|---|
| 6,871,978 B2 | 3/2005 | Chan et al. |
| 6,887,001 B2 | 5/2005 | Kitamura et al. |
| 6,940,490 B1 | 9/2005 | Kim et al. |
| 6,977,352 B2 | 12/2005 | Oosawa |
| 6,997,572 B2 | 2/2006 | Ono et al. |
| 7,014,377 B2 | 3/2006 | Yamauchi |
| 7,034,232 B2 | 4/2006 | Ide et al. |
| 7,038,152 B2 * | 5/2006 | Watanabe .................. 200/314 |
| 7,057,125 B1 * | 6/2006 | Tsai ........................... 200/310 |
| 2002/0114153 A1 | 8/2002 | Chan et al. |
| 2002/0122683 A1 * | 9/2002 | Kamei et al. ............... 400/472 |
| 2003/0090885 A1 | 5/2003 | Hsu |
| 2003/0227766 A1 | 12/2003 | Hom et al. |
| 2005/0000788 A1 | 1/2005 | Nishimura |
| 2006/0092619 A1 | 5/2006 | Hsu et al. |

FOREIGN PATENT DOCUMENTS

| | | |
|---|---|---|
| GB | 2065373 A | 6/1981 |

OTHER PUBLICATIONS

Webster's dictionary definition of membrane: http://www.merriam-webster.com/dictionary/flexible; May 7, 2010.*

* cited by examiner

PIANO-STYLE KEYPAD EMPLOYING A LIGHT GUIDE

BACKGROUND

1. Field

The disclosed and claimed concept relates generally to keypads for handheld electronic devices and, more particularly, to a lighted piano-style keypad.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature a wireless communication capability, although many such handheld electronic devices are stand-alone devices that are functional without communication with other devices.

Such handheld electronic devices are generally intended to be portable, and thus are of a relatively compact configuration. Piano-style keypads typically provide keys that have very little space therebetween and derive their name from the keys of a piano, which typically are disposed very closely adjacent one another with an extremely small space therebetween. Piano-style keypads provide relatively greater numbers of usable keys in relatively smaller spaces compared with conventionally-spaced keypads due to the very close spacing of the keys of a piano-style keypad. While such piano-style keypads have been generally effective for their intended purposes, such piano-style keypads have not been without limitation.

Piano-style keypads typically comprise a number of key bodies disposed on a resilient web, and further comprise key caps adhered to the key bodies. The web is deflectable to allow a key body to be translated slightly toward a handheld electronic device when a key is being actuated. While the key bodies are typically spaced apart from one another on the web, the key caps that are adhered to the key bodies typically are disposed very close to one another with minimal space therebetween, thus providing the "piano-style" aspect to the keypad.

A number of competing factors typically bear upon the ultimate design of a piano-style keypad. For instance, in order to provide long term reliability of the key caps adhered to the key bodies, each key body typically must have an exterior surface with at least about fifteen square millimeters of adherable area for adhering of the key caps to the key bodies. Additionally, the portion of the resilient web that is peripheral to a key body and that is deflectable when a key body is being translated toward the handheld electronic device desirably has a radial length, i.e., a length in a direction pointed away from the key body in the plane of the web, of at least 0.6 millimeters. Such a length has been determined to provide long term reliability while allowing the key bodies to be easily actuated and to provide a desirable tactile response during such actuation.

Some previous keypads have provided a light guide and key bodies formed as a single component that is molded in a multi-step process. The light guide would be formed from a light-transmitting material, such as a clear plastic. The light guide would then be positioned in a mold, and uncured resilient material would be poured into the mold in contact with the light guide. The resilient material would cure, thus providing resilient structures and key bodies molded to the light guide. However, the size of the resilient structures was limited by the size of the light guide. That is, for a given space, the larger the light guide was, the relatively smaller would be the resilient structures and key bodies molded to the light guide.

As the number of piano-style keys within a given area increases, the adherable surface area of the key bodies and/or the radial length of the web peripheral to the key bodies must decrease, but can only be decreased to a certain extent and cannot be smaller than the aforementioned dimensions. As such, piano-style keypads of a particular size could have only a limited number of keys. It thus would be desirable to provide an improved piano-style keypad that overcomes or at least partially alleviates such limitations.

BRIEF DESCRIPTION OF THE DRAWINGS

A further understanding of the disclosed and claimed concepts can be gained from the following Description when read in conjunction with the accompanying drawings in which:

FIG. 1A is a schematic view of an exemplary handheld electronic device incorporating the improved keypad of FIG. 1;

Similar numerals refer to similar parts throughout the specification.

DESCRIPTION

Figure 1:
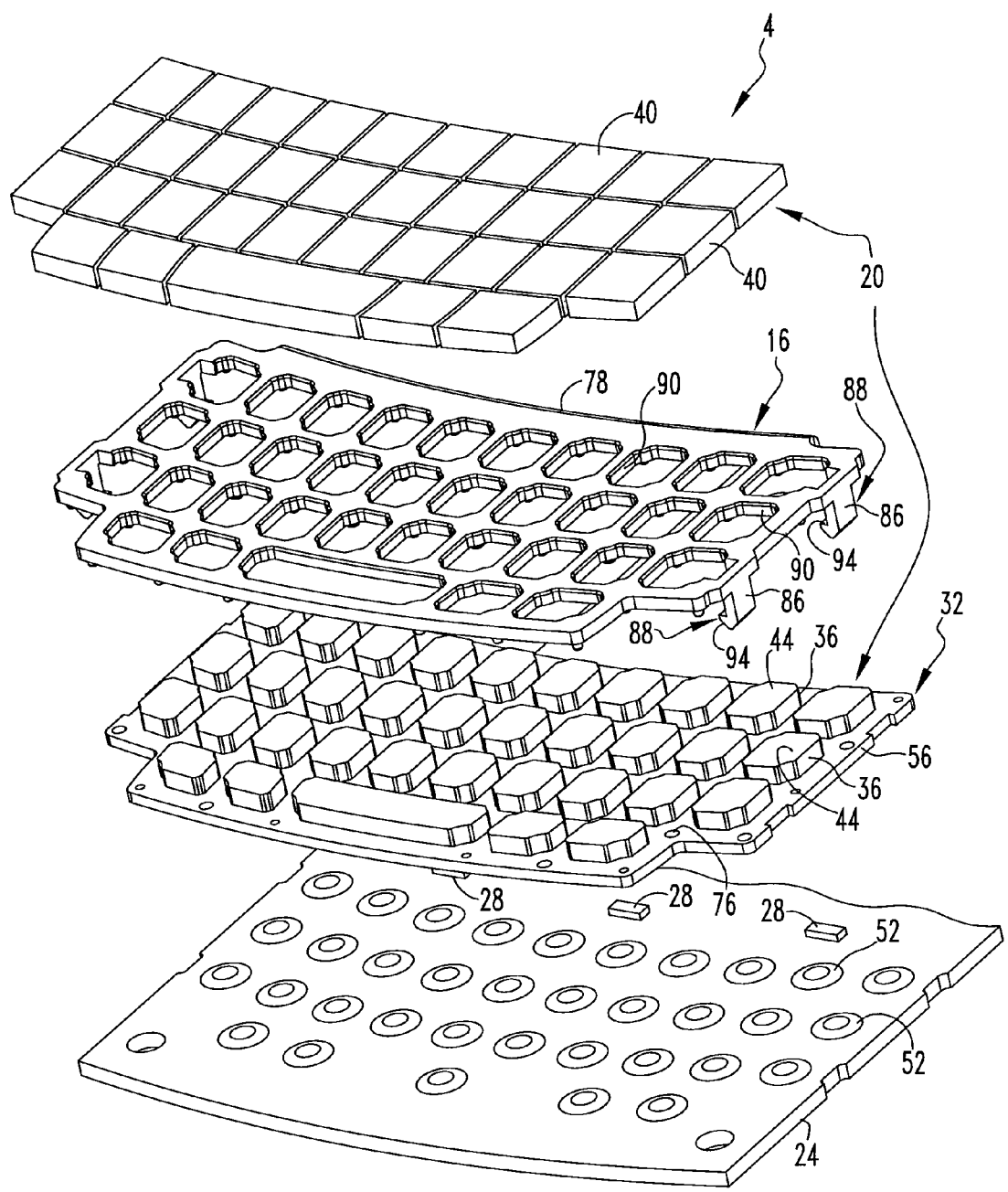
FIG. 1 is an exploded perspective view of an improved keypad in accordance with the disclosed and claimed concept.

An improved keypad 4 is depicted generally, in whole or in part, in FIGS. 1 and 2-9. The improved keypad 4 is a piano-style keypad that can be employed in a handheld electronic device 6, such as is depicted schematically in FIG. 1A. The exemplary handheld electronic device 6 comprises an input apparatus 8, a processor apparatus 10, and an output apparatus 12. The keypad 4 is a component of the input apparatus 8. The processor apparatus 10 is structured to receive input from the input apparatus 8 and to provide output to the output apparatus 12.

As can be understood from FIG. 1, the keypad 4 comprises a light guide 16 and a key sheet 20. In the exemplary depicted embodiment of the keypad 4, the light guide 16 mounts the key sheet 20 to a substrate 24, such as a printed circuit board of the handheld electric device 6. At least a portion of the key sheet 20 is translucent, as is at least a portion of the light guide 16. As employed herein, the expression "translucent" and variations thereof shall refer broadly to a quality that permits the passage of light and may include a transparent quality wherein light is transmitted without appreciable scattering so that it does not meaningfully alter light waves traveling therethrough. The light guide 16 is configured to transmit light from a light source, such as a number of LEDs 28 on the substrate 24, to the key sheet 20 to provide illumination of the keys 42 (FIG. 4) of the keypad 4. As employed herein, the expression "a number of" and variations thereof shall refer broadly to any nonzero quantity including a quantity of one.

As can be further seen from FIG. 1, the key sheet 20 comprises a resilient base 32 upon which are disposed a number of key bodies 36. The key sheet 20 additionally includes a number of key caps 40. Each key body 36 has a mounting surface 44 that is substantially planar, for example, and the key caps 40 are adhered to the mounting surfaces 44. As employed herein, the expression "adhered" and variations thereof shall refer broadly to a situation in which two solids are fastened together such as by the use of glue, cement, other adhesive, or through to use of a fusion or other joining process, and between which an adhesive bond or other fusion bond has been created. A key body 36 and a key cap 40 together form a key 42 (FIG. 4) of the keypad 4. The keypad 4 is advantageously configured such that each mounting surface 44 has an adherable area of at least fifteen square millimeters. In the present exemplary embodiment, the mounting surfaces 44 generally each have an adherable area of at least about twenty square millimeters.

Each key body 36 has an actuator 48 (FIGS. 2 and 3) protruding therefrom opposite the mounting surface 44. Each key body 36 is movable between an unactuated position, such as is depicted generally in FIG. 8, and an actuated position, such as is depicted generally in FIG. 9. In the actuated position, the actuator 48 engages a dome 52 that is disposed on the substrate 24, and as a result completes an electrical circuit of the handheld electronic device 6. The closing of such a circuit can provide, for example, an input to the processor apparatus 10.

Figure 2:
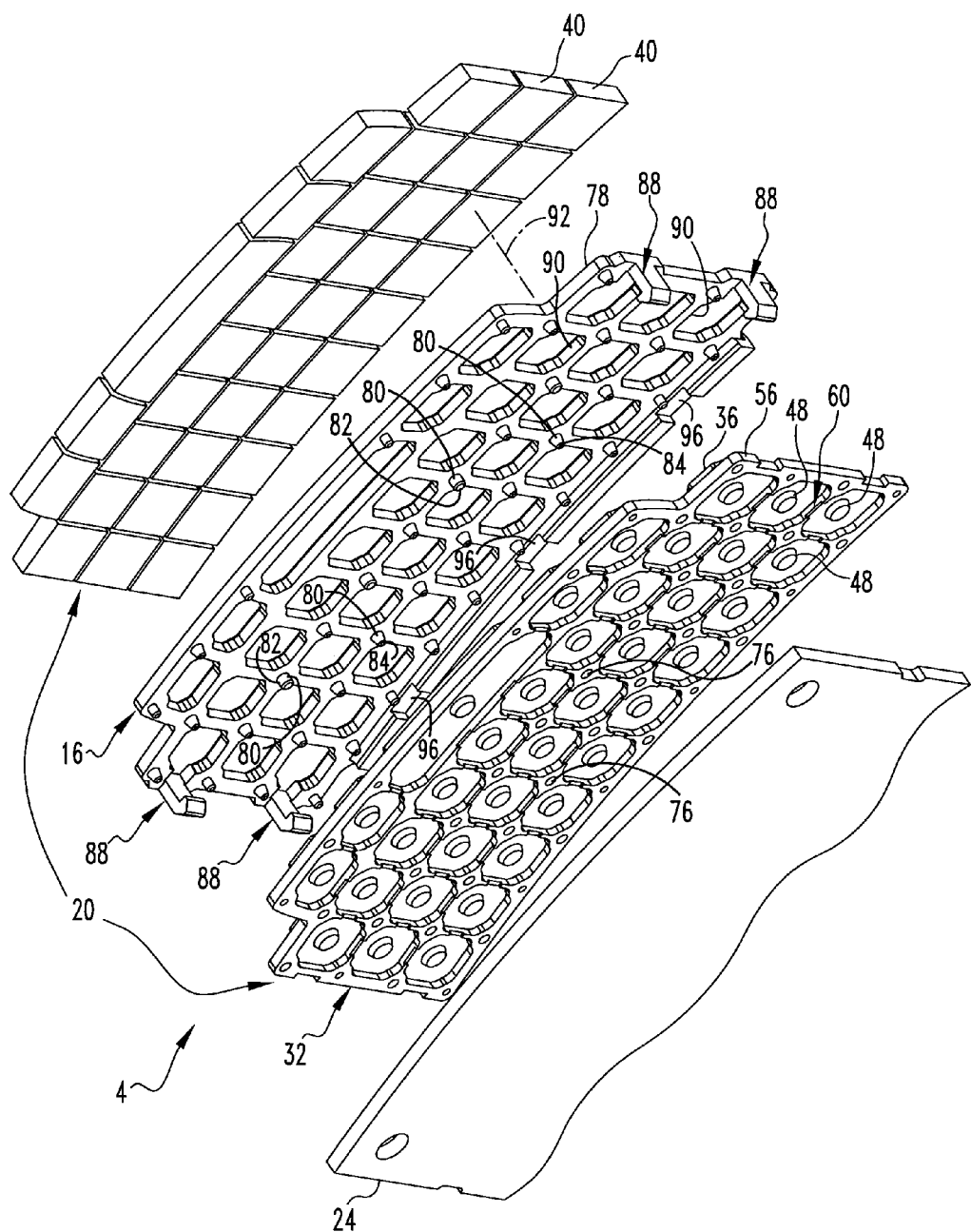
FIG. 2 is another exploded perspective view of the keypad of FIG. 1.
Figure 3:
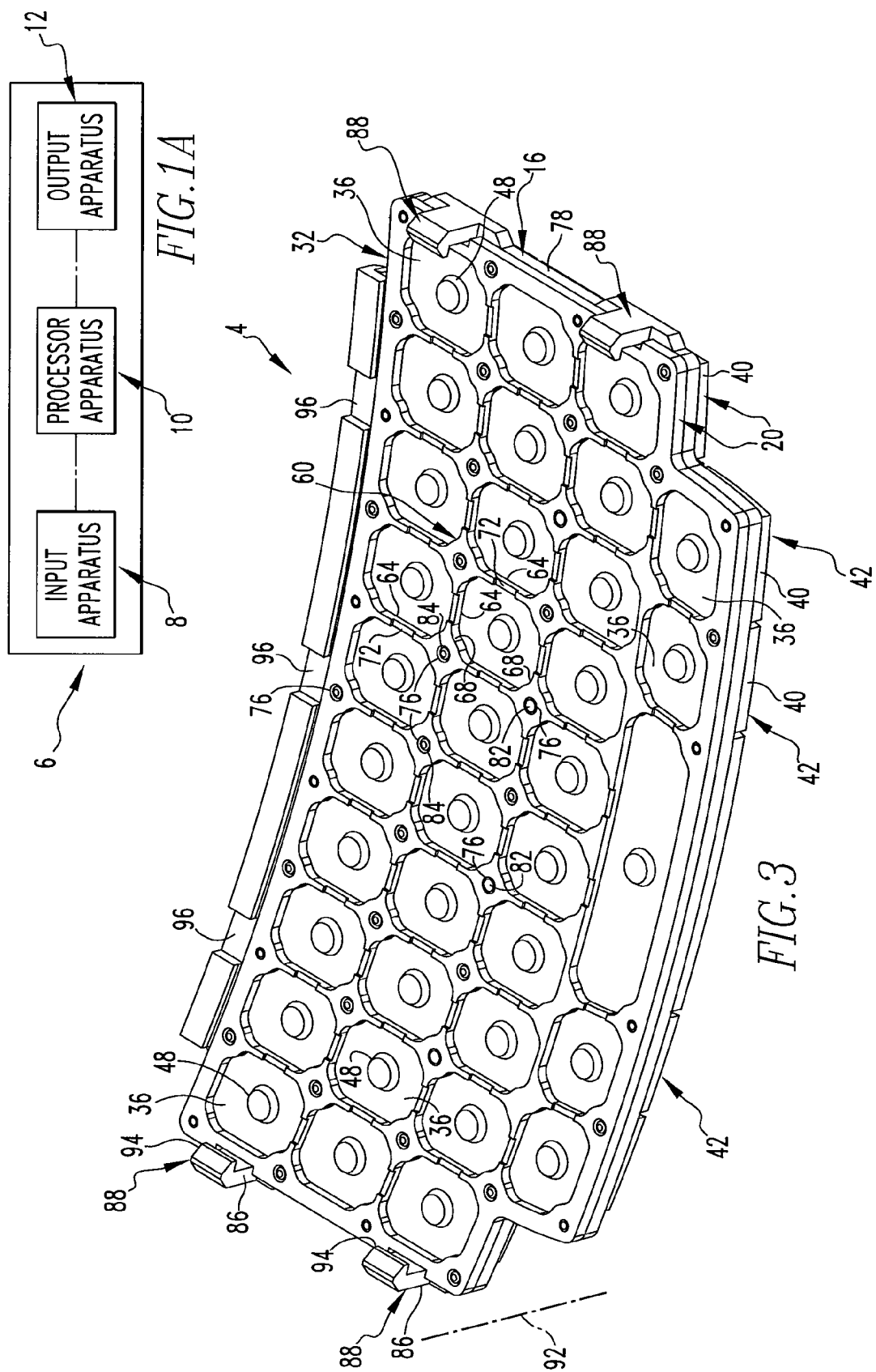
FIG. 3 is a perspective view of the keypad.

As can be understood from FIGS. 2 and 3, the base 32 comprises a web 56 and a leg network 60. The key bodies 36 can generally be said to be disposed on the web 56. The leg network 60 protrudes from the web 56 and is engaged with the substrate 24. As can be understood from FIGS. 8 and 9, the portion of the web 56 that is peripheral to any given key is movable between an undeflected position, such as is depicted generally in FIG. 8, and a deflected position, such as is depicted generally in FIG. 9, when the given key body 36 is moved between its unactuated and actuated positions. The portion of the web 56 peripheral to a given key body 36 is in an undeflected position when the key body 36 is in an unactuated position, such as depicted generally in FIG. 8, and such portion of the web 56 is in a deflected position when the given key body 36 is in an actuated position, such as is depicted generally in FIG. 9.

The leg network 60 comprises a plurality of legs 64 and a plurality of islands 68. The legs 64 extend between the islands and generally each are formed to include a notch 72 that allows the passage of air from the region between a specific key body 36 and the substrate 24 when the specific key body 36 is moved toward the actuated position.

The islands 68 generally each have a hole 76 formed therein that serves as a receptacle for a support structure of the light guide 16. The islands 68 are of a cross section in a plane transverse to the plane of the substrate 24 that is relatively larger than a similarly oriented cross sectional area of a leg 64. The islands 68 advantageously resist the deformation of the portions of the web 56 adjacent a particular key body 36 when the particular key body 36 is moved between the unactuated and actuated positions.

The light guide 16 includes a frame 78, a number of supports 80, and a number of retention members 88. The frame 78 has a number of openings 90 formed therein. The key bodies 36 are disposed within the openings 90. The supports 80 are in the form of pins that protrude from the frame 78 in a direction indicated by the axis 92 in FIG. 2. The supports are receivable in the holes 76, as indicated above, to provide support to the key sheet 20 and to resist movement of the key sheet 20 in directions transverse to the axis 92.

The supports 80 in the exemplary depicted embodiment, as can be seen in FIG. 2, are of two types. Specifically, the supports 80 include a number of first supports 82 that are of a generally cylindrical configuration and a number of second supports 84 that are generally of a frusto-conic, i.e., truncated cone, configuration. The first supports 82 are receivable with an interference fit in the holes 76. The second supports 84 are receivable in the hole 76 with a generally clearance fit. The first supports 82 provide a relatively greater degree of support to the key sheet 20 than the second supports 84, although the number of first supports 82 is limited in order to limit the force required to assemble the keypad 4.

Each retention member 88 comprises a shank 86 protruding from the frame 78 and a latch 94 disposed at a free end of the shank 86. The shanks 86, and thus the retention members 88, protrude from the same face of the frame 78 as the supports 80 and extend from the frame 78 along the axis 92.

Figure 4:
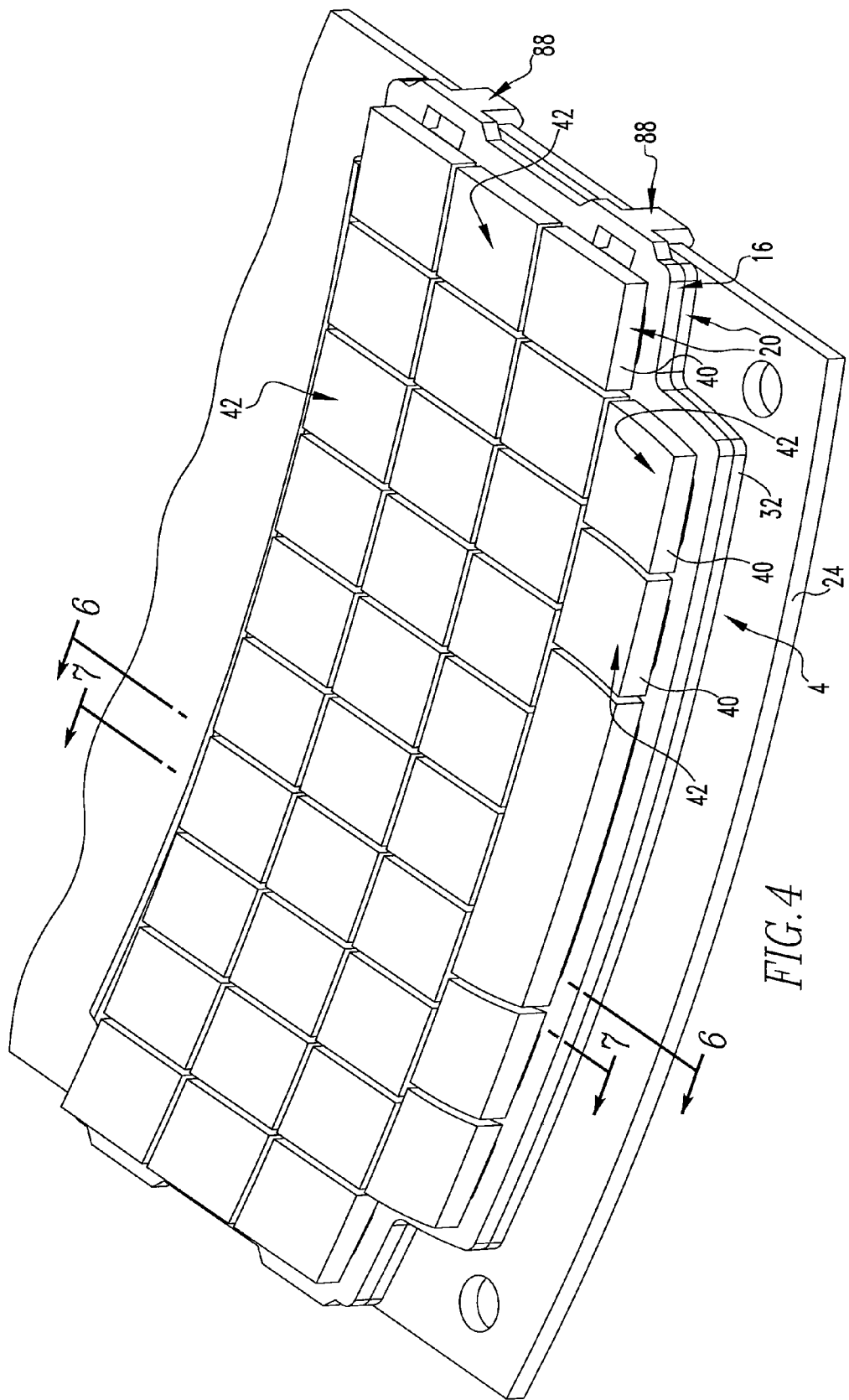
FIG. 4 is another perspective view of the keypad.
Figure 6:
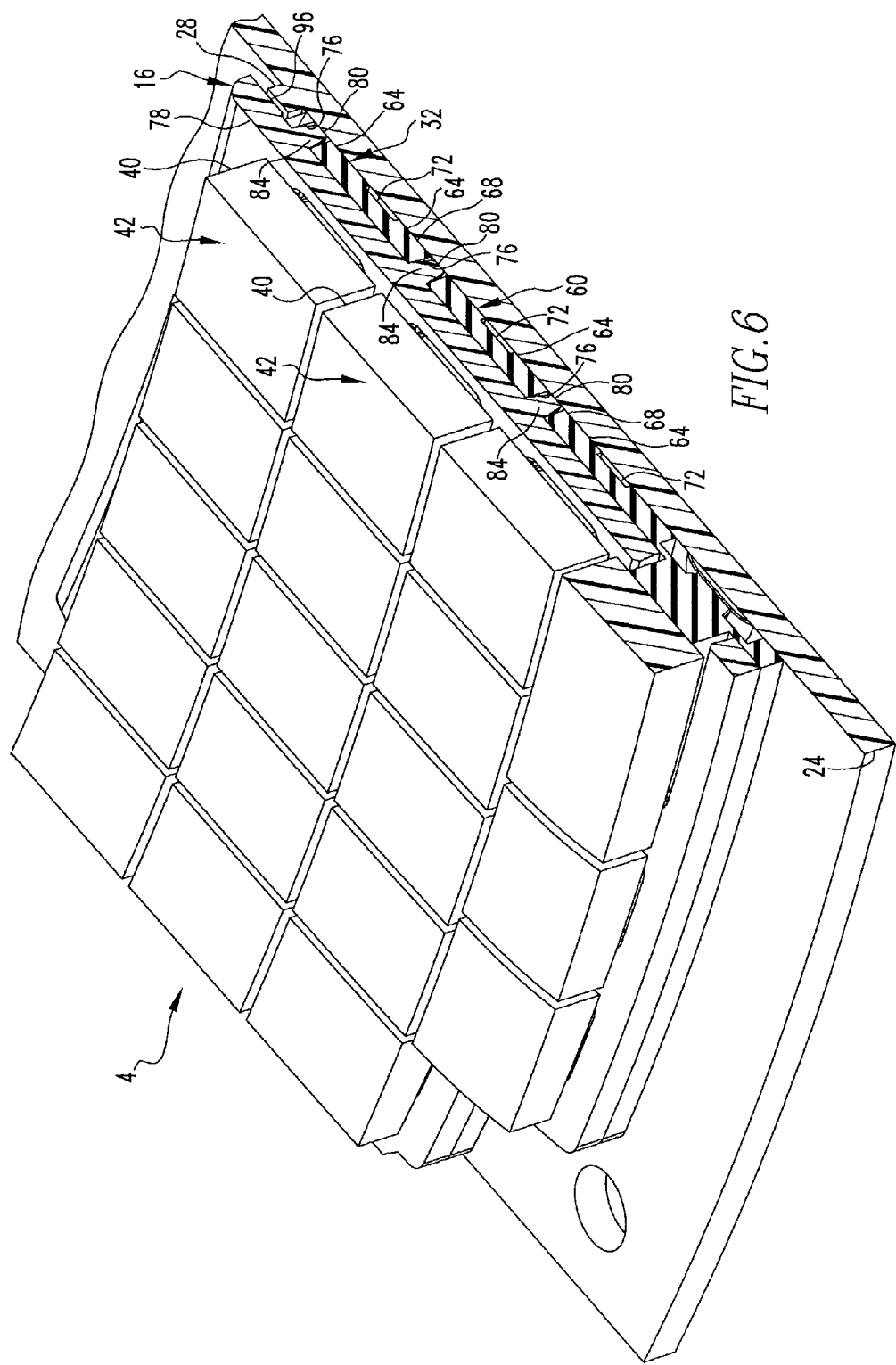
FIG. 6 is a sectional view as taken along line 6-6 of FIG. 4.
Figure 7:
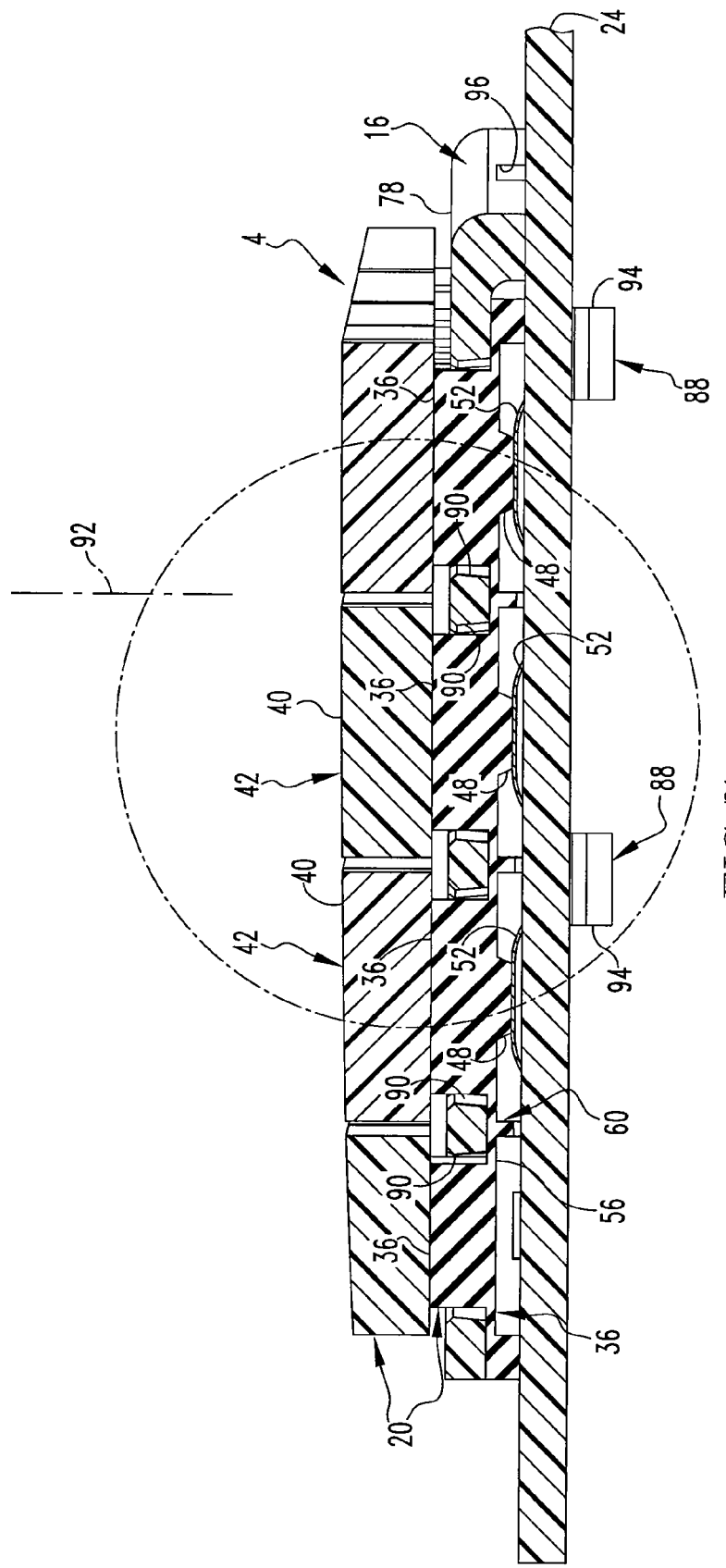
FIG. 7 is a sectional view as taken along line 7-7 of FIG. 4.

The light guide 16 additionally has a number of recesses 96 formed therein and within which the light sources 28 are disposed when the keypad 4 is in an assembled condition, such as is depicted generally in FIGS. 4 and 6. As can be further be seen in FIG. 4, the key caps 40 are closely spaced, meaning that the space between adjacent key caps 40 is very small when compared with the dimensions of each key cap 40, and typically will be no more than about ten percent of a given dimension of a key cap 40, for example, it being noted that the spacing between the key caps 40 depicted in FIG. 4 is greatly exaggerated.

The latches 94 engage an underside of the substrate 24, i.e., a surface of the substrate 24 opposite that on which the domes 52 are disposed. The engagement of the latches 94 of the light guide 16 with the substrate 24 retains the key sheet 20 mounted to the substrate 24 and disposed generally between the frame 78 and the substrate 24. More particularly, the base 32 is generally interposed between the frame 78 and the substrate 24. As indicated above, the supports 80 of the light guide 16 received in the holes 76 provide support to the key sheet 20 and resist movement of the key sheet 20 in directions transverse to the axis 92. The light guide 16 thus retains the key sheet 20 on the substrate 24 and transmits light from the light sources 28 to the key sheet 20.

Figure 9:
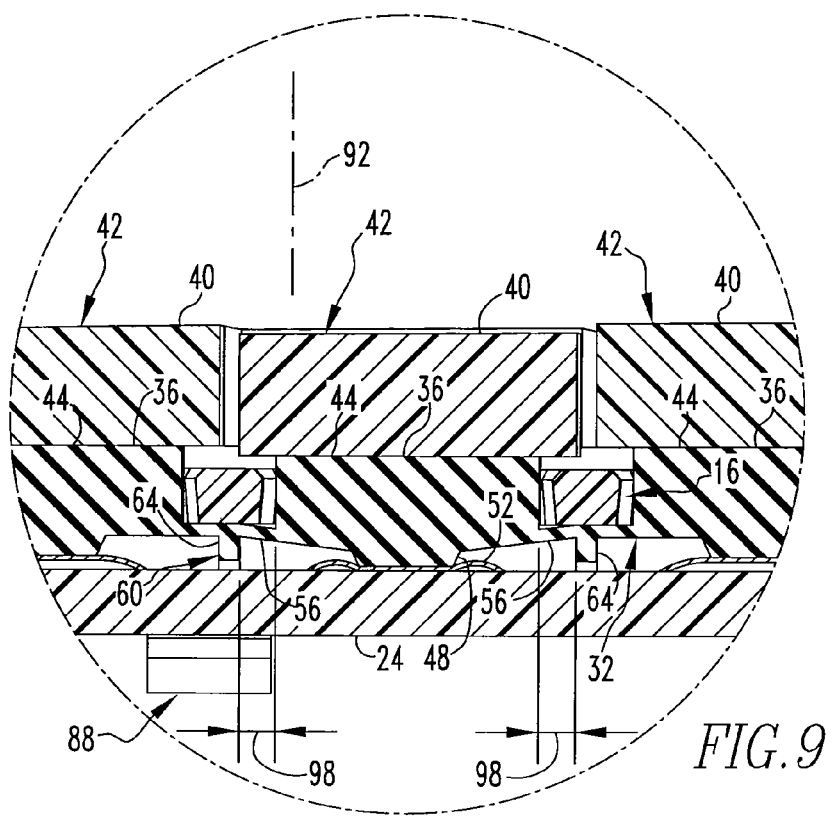
FIG. 9 is a view similar to FIG. 8, except showing a key of the keypad in an actuated position.

As can be understood from FIG. 9, the portions of the web 56 that are peripheral to a particular key body 36 have a radial distance between the key body 36 and the leg network 60 that is at least 0.6 millimeters, as is indicated by the dimension 98. Such a dimension 98 allows for easy actuation of the key bodies 36, desirable tactile feedback to the user, and long-term reliability.

Figure 8:
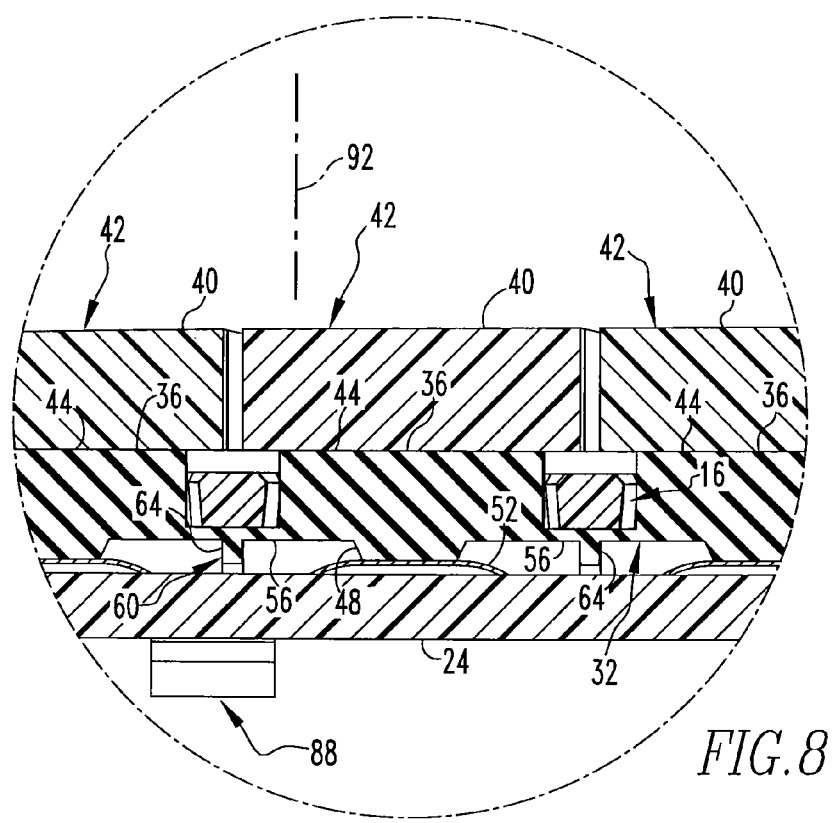
FIG. 8 is an enlarged view of the encircled portion of FIG. 7.

As can be further understood from FIGS. 8 and 9, leg network 60 is disposed generally between the web 56 and the substrate 24. Moreover, it can be seen that the frame 78 is disposed generally between the key caps 40 and the web 56.

Figure 5:
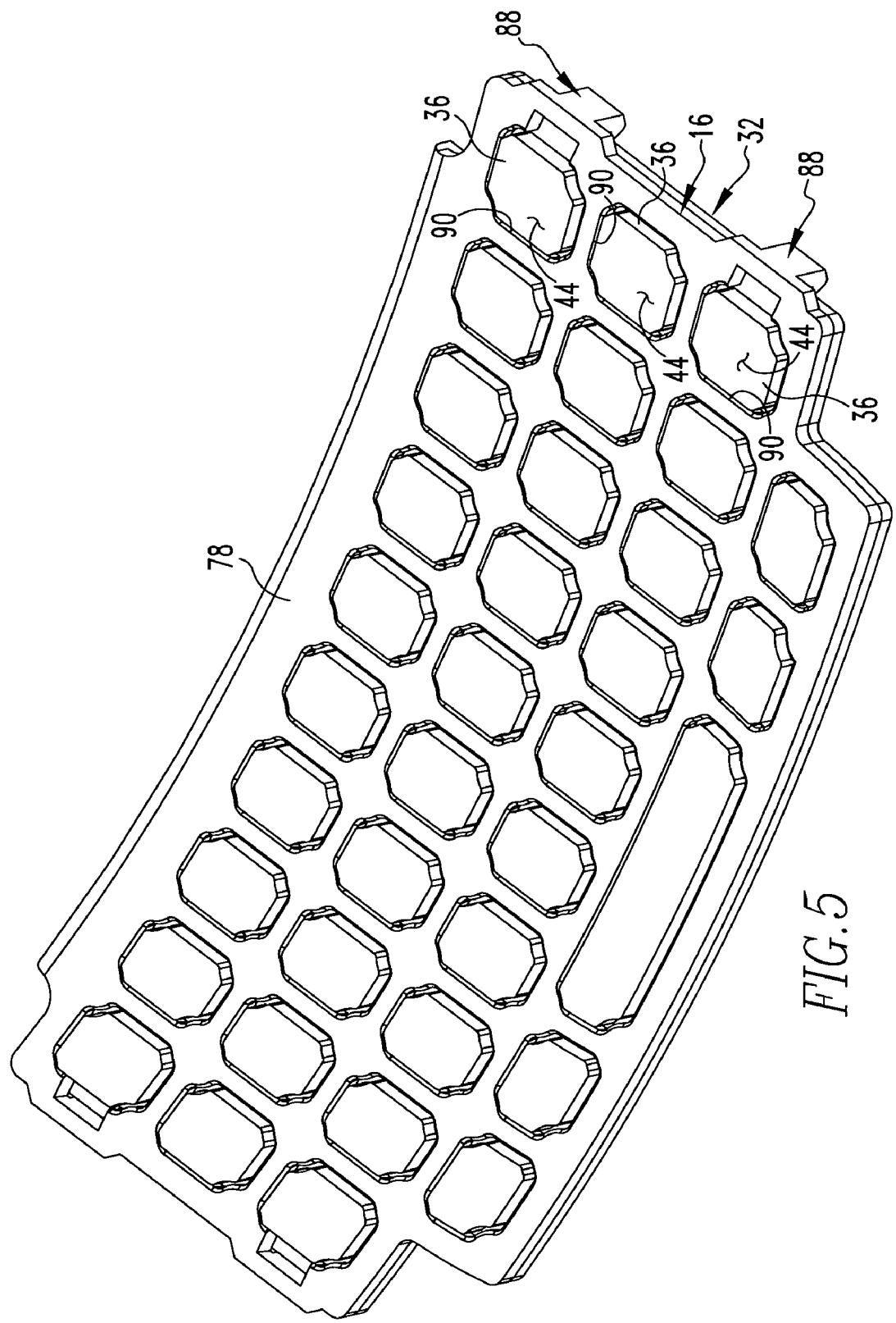
FIG. 5 is a perspective view a portion of the keypad.

Many of the key bodies 36 are configured such that the mounting surface 44 thereof, such as are depicted generally in FIG. 5, generally each have gross dimensions of roughly 4.0 millimeters by 5.0 millimeters, thereby enabling the mounting surface 44 to have an adherable area of about 20.0 millimeters. As can be understood from FIG. 6, the supports 80 engage the web 56 and also engage the substrate 24.

The improved keypad 4 is thus configured in a fashion whereby the light guide generally does not serve as a limiting factor in the design of the keypad, which permits a relatively large number of keys 42 to be provided in a relatively small area. For instance, the keypad 4 could be a full QWERTY, QWERTZ, AZERTY, etc., keypad on a handheld electronic device, such as the handheld electronic device 6, without the handheld electronic device being of an undesirably large size. The improved keypad 4 additionally provides a key sheet 20 that is supported by a light guide 16, which resists unintended movement or slumping of the key sheet 20, and which further contributes to the ability of the keypad 4 to provide a large number of keys 42. The islands 68 advantageously resist unintended closing of circuits of the handheld electronic device 6, and thus resists unintended input to the processor apparatus 10, by mechanically isolating a portion of the web 56 from moving toward its deflected position when an adjacent key body 36 is moved to its actuated position.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A keypad for a handheld electronic device that comprises a light source, the keypad comprising:
    a key sheet comprising a base and a number of key bodies, at least some of the key bodies each being disposed on the base and being movable between an unactuated position and an actuated position, the key body in the actuated position being structured to complete a circuit of the handheld electronic device, at least a portion of the key sheet being translucent; and
    a light guide comprising a frame and a number of supports, at least some of the supports extending in a common direction from the frame, at least a portion of the frame being disposed adjacent at least a portion of the base, at least some of the supports each engaging the base and being structured to resist movement of the base in a direction transverse to the common direction, at least a portion of the light guide being translucent and being structured to transmit light between the light source and the key sheet,
    wherein the base comprises a web and a leg network, the leg network protruding from the web and being structured to engage a substrate of the handheld electronic device, a portion of the web peripheral to a particular key body being movable between an undeflected position and a deflected position, the portion of the web being in the undeflected position when the particular key body is in the unactuated position, the portion of the web being in the deflected position when the particular key body is in the actuated position.

2. The keypad of claim 1 wherein the key sheet comprises a number of receptacles, at least some of the supports each being received in a receptacle.

3. The keypad of claim 2 wherein the receptacles are holes formed in the base, and wherein the supports are pegs that protrude from the frame and that are received in the holes.

4. The keypad of claim 3 wherein at least some of the pegs each have an interference fit with a hole.

5. The keypad of claim 1 wherein the leg network comprises a plurality of braces structured to engage the substrate, the braces being structured to resist movement of a portion of the web peripheral to one key body toward its undeflected position when a portion of the web peripheral to an adjacent key body moves toward its deflected position.

6. The keypad of claim 5 wherein at least some of the braces each have a hole formed therein, and wherein the supports are pegs that are received in the holes, at least some of the key bodies being movable along the common direction between the unactuated and actuated positions.

7. The keypad of claim 1 wherein the key sheet further comprises a number of key caps, at least some of the key caps each being adhered to a key body.

8. The keypad of claim 7 wherein the frame has a number of openings formed therein, at least some of the key bodies each being disposed within an opening.

9. The keypad of claim 7 wherein at least a portion of the frame is disposed between the base and the key caps.

10. A keypad for a handheld electronic device that comprises a light source, the keypad comprising:
    a key sheet comprising a base a number of key bodies, and a number of key caps, at least some of the key bodies each being disposed on the base and being movable between an unactuated position and an actuated position, the key body in the actuated position being structured to complete a circuit of the handheld electronic device, at least some of the key caps each being adhered to a key body, at least a portion of the key sheet being translucent; and
    a light guide comprising a frame and a number of supports, at least a portion of the light guide overlying at least a portion of the base, at least a portion of the frame being disposed between the base and the key caps, at least a portion of the light guide being translucent and being structured to transmit light between the light source and the key sheet.

11. The keypad of claim 10 wherein the light guide has a number of openings formed therein, at least some of the key bodies each being disposed within an opening.

12. The keypad of claim 11 wherein the openings are formed in the frame.

13. The keypad of claim 10 wherein the base comprises a web and a leg network, the leg network protruding from the web and being structured to engage a substrate of the handheld electronic device, a portion of the web peripheral to a particular key body being movable between an undeflected position and a deflected position, the portion of the web being in the undeflected position when the particular key body is in the unactuated position, the portion of the web being in the deflected position when the particular key body is in the actuated position.

14. The keypad of claim 13 wherein at least a portion of the web is disposed between the leg network and at least a portion of the light guide.

15. The keypad of claim 14 wherein the portion of the web peripheral to the particular key body extends between the particular key body and at least a portion of the leg network.

16. A keypad for a handheld electronic device that comprises a light source, the keypad comprising:
    a substrate;
    a light guide comprising a frame, a number of supports, and a number of retention members, the number of supports and the number of retention members extending in a common direction from the frame, at least some of the retention members each being engaged with the substrate;
    a key sheet comprising a base and a number of key bodies, at least some of the key bodies each being disposed on the base and being movable between an unactuated position and an actuated position, the key body in the actuated position being structured to complete a circuit of the handheld electronic device, at least a portion of the key sheet being disposed between at least a portion of the light guide and at least a portion of the substrate, at least some of the supports each engaging the base and being structured to resist movement of the base in a direction transverse to the common direction, at least a portion of the key sheet being translucent; and at least a portion of the light guide being translucent and being structured to transmit light between the light source and the key sheet.

17. The keypad of claim 16 wherein at least some of the retention members each comprise a latch that is engaged with the substrate.

18. The keypad of claim 16 wherein the base has a number of holes formed therein, and wherein the supports are pins received in the holes.

19. The keypad of claim 16 wherein the key sheet further comprises a number of key caps, at least some of the key caps each being adhered to a key body.

20. The keypad of claim 19 wherein the frame has a number of openings formed therein, at least some of the key bodies each being disposed within an opening.

21. The keypad of claim 19 wherein at least a portion of the frame is disposed between the base and the key caps.

* * * * *